United States Patent [19]

Pierron

[11] 4,312,488
[45] Jan. 26, 1982

[54] CLAMP FOR SECURING ARTICLES OF ROUND CROSS SECTION

[75] Inventor: Claude Pierron, Le Hameau Fleuri Villa, France

[73] Assignee: A. Raymond, Lorrach, Fed. Rep. of Germany

[21] Appl. No.: 55,310

[22] Filed: Jul. 6, 1979

[30] Foreign Application Priority Data

Jul. 8, 1978 [DE] Fed. Rep. of Germany ....... 2830096

[51] Int. Cl.³ .............................................. F16L 3/08
[52] U.S. Cl. ........................... 248/74 R; 16/DIG. 13; 24/327; 24/376; 248/65; 248/74 A
[58] Field of Search ...................... 248/74 R, 74 A, 65; 24/327, 73 AP, 73 P, 73 TH, 81 TH, 79, 81, DIG. 22, 376; 16/DIG. 13; 174/170

[56] References Cited

U.S. PATENT DOCUMENTS

| | | | |
|---|---|---|---|
| 2,068,902 | 1/1937 | Blunt | 248/74 R |
| 2,658,247 | 11/1953 | Heuer | 174/170 X |
| 3,080,140 | 3/1963 | Gohs et al. | 248/74 R |
| 3,423,055 | 1/1969 | Fisher | 24/73 AP |
| 3,749,820 | 7/1973 | Langlie | 24/73 AP |
| 3,836,102 | 9/1974 | Hall | 248/74 R |
| 3,896,527 | 7/1975 | Miller et al. | 16/DIG. 13 |
| 3,927,949 | 12/1975 | Clinch | 16/DIG. 13 |
| 4,029,277 | 6/1977 | Bulanda | 248/74 R |
| 4,061,873 | 12/1977 | Berg, Jr. | 24/237 X |
| 4,083,523 | 4/1978 | Fisher | 24/73 AP |

FOREIGN PATENT DOCUMENTS

| | | | |
|---|---|---|---|
| 2306670 | 9/1974 | Fed. Rep. of Germany | 24/376 |
| 2516844 | 10/1976 | Fed. Rep. of Germany | 248/74 R |
| 1331458 | 5/1963 | France | 248/74 R |
| 2439350 | 1/1980 | France | 248/74 R |
| 7412046 | 3/1975 | Netherlands | 248/74 R |
| 1155472 | 6/1969 | United Kingdom | |

Primary Examiner—James T. McCall
Attorney, Agent, or Firm—Finnegan, Henderson, Farabow, Garrett & Dunner

[57] ABSTRACT

A clamp for grasping elongated articles of generally round cross section, comprising an abutment body having a substantially planar clamping surface and having front and rear portions with respect to the direction of insertion of an article into the clamp, at least one J-shaped clamping jaw pivotally mounted to the rear portion of the abutment body by a resilient pivot integral with the jaw and the abutment body, with the jaw having a curved clamping surface formed substantially as an arc of a circle, wherein the rotational axis of the pivot is parallel to the axis of an article caught between the clamping surfaces, the clamping jaw being biased into clamping relationship by the resilient pivot, and wherein the rotational axis does not lie inside the projection of the planar clamping surface, with respect to the curved clamping surface. In a preferred embodiment, the rotational axis of the pivot does not lie inside the line determined by the distal end of the arc of the circle determined by the arc and the center of the circle, with respect to the curved clamping surface.

10 Claims, 11 Drawing Figures

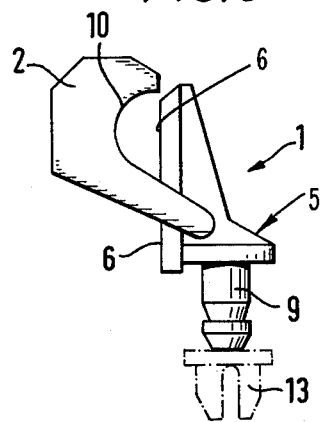
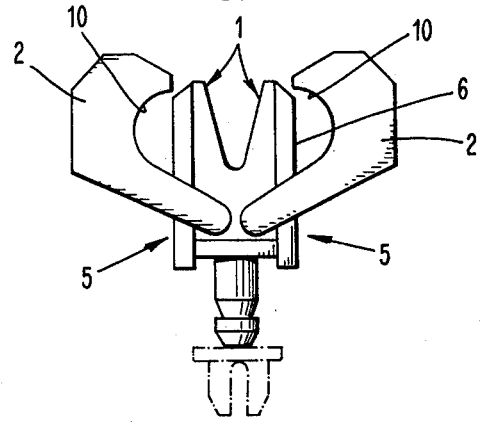
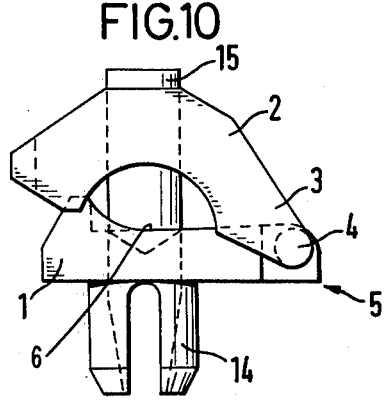
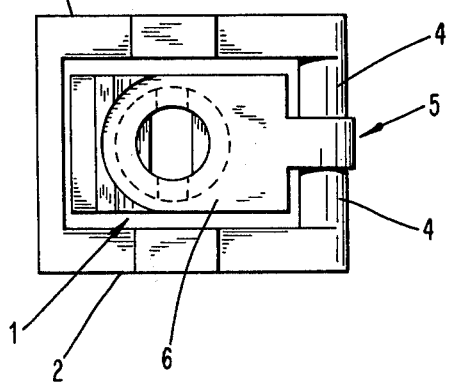

CLAMP FOR SECURING ARTICLES OF ROUND CROSS SECTION

BACKGROUND OF THE INVENTION

The present invention relates to a resilient clamp for securing articles of round cross section, such as rods, pipes, cables, etc., and of different diameters to a support, and particularly relates to a plastic clamp comprising an abutment body and clamping arms of generally circular shape in the clamping region, with the clamping arms being integral with the abutment body with which they are resiliently joined.

When securing articles or bars of round cross section to supports, such as for instance when mounting cables or conduits to body plates in motor vehicle construction, it is important that articles of different diameters can be easily pressed by hand into the fastening clamp when it is mounted on a support plate, and that, when desired, the articles may be easily removed from the clamp. On the other hand, it must be reliably insured that the clamped articles cannot bounce out of, or be accidentally detached from, the fastening clamp because of reasonably expected vibrations, impacts, or other forces.

British Pat. No. 1,155,472 discloses a resilient fastening clamp in which a relatively dimensionally stable yoke passes from an abutment body around and spaced from the article to be fastened so as to leave a gap with respect to the abutment body, the yoke being integrally joined at its distal end with a resilient clamping arm which extends into the interior space of the clamp. This clamping arm presses the inserted article against the abutment body, which is mounted on a support. While this fastening clamp meets the requirement of easy article insertion, it provides, on the other hand, only slight clamping strength, and therefore a clamped cable may easily become detached under additional loads or stresses.

SUMMARY OF THE INVENTION

It is an object of the present invention to provide a resilient, one-piece clamp, typically comprised of a plastic material, which will permit easy manual insertion and removal of articles of round cross section, and which will permit clamping of the articles with such force that they cannot become detached or dislodged when subjected to typical external forces.

This problem is solved according to the present invention by providing a clamp having clamping arms which are mounted by their ends in a flexurally rotating manner, i.e., rotatable by twisting about a fixed, resilient pivot, to the rear end of an abutment body having a planar clamping surface, as seen in the direction in which the clamped article is inserted into the clamp. The pivots are attached to the abutment body along or beyond the projection of the planar clamping surface, as seen from the clamping arms.

In accordance with the present invention, the pivot junction between the clamping arms and the abutment body, and the particular position of the pivots, provide a clamp wherein the pivots need only be torsion-loaded, i.e., twisted, when the clamping arms are opened, so that the article to be clamped may be easily inserted or removed by hand. In contrast, when the clamped article is subjected to external forces tending to remove it, such forces will cause the pivots to bend, rather than twist, so that in order for the article to be unintentionally dislodged, the applied force must exceed the bending resistance of the pivots.

In accordance with further embodiments of the invention the particular position of the pivots and the force component acting on the clamping arms also provide a certain self-closing effect which tends to push the clamping arms against the clamped article with greater force in the presence of external forces which might otherwise tend to dislodge it.

Additional objects and advantages of the invention will be set forth in part in the description which follows, and in part will be obvious from the description, or may be learned by practice of the invention. The object and advantages of the invention will be realized and attained by means of the instrumentalities and combinations, particularly pointed out in the appended claims.

To achieve the above-identified and other objects, and in accordance with the purpose of the invention, as embodied and broadly described herein, the invention comprises a one-piece clamp for grasping elongated articles of generally round cross section, comprising an abutment body having a substantially planar clamping surface and having front and rear portions with respect to the direction of insertion of an article into the clamp, at least one J-shaped clamping jaw pivotally mounted to the rear portion of the abutment body by a resilient pivot integral with the jaw and the abutment body, with the jaw having a curved clamping surface formed substantially as an arc of a circle, wherein the rotational axis of the pivot is parallel to the axis of an article caught between the clamping surfaces, the clamping jaw being biased into clamping relationship by the resilient pivot, and wherein the rotational axis does not lie inside the projection of the plane of the planar clamping surface, with respect to the curved clamping surface. In a preferred embodiment of the invention, the rotational axis of the pivot does not lie inside the line determined by the distal end of the arc of the circle of the curved clamping surface and the center of the circle, with respect to the curved clamping surface. It is also preferred to utilize a pair of J-shaped jaws, with the jaws lying substantially in parallel on opposite sides of the abutment body. Typically the clamp is constructed of a resilient plastic material and the rear portion of the abutment body carries means for securing the clamp to a support. The abutment body is preferably of T-shaped latitudinal cross section, with the upper surface of the crosspiece comprising the planar clamping surface and the pivot being attached to the base of the T-shape.

The accompanying drawings, which are incorporated in and constitute a part of this specification, illustrate various embodiments of the invention and, together with the description, serve to explain the principles of the invention.

BRIEF DESCRIPTION OF THE DRAWINGS

FIG. 8 illustrates a further embodiment of the invention with laterally offset clamping arms.

FIG. 9 shows a fastening clamp according to the invention using the same design principle shown in FIG. 8, with two sets of clamping arms.

FIG. 10 shows a further embodiment of the invention in side view, wherein a cable is inserted from the side; and FIG. 11 shows the clamp of FIG. 10 in top view.

DESCRIPTION OF THE PREFERRED EMBODIMENTS

Figure 1:
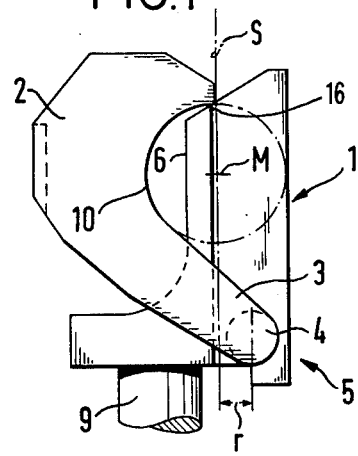
FIG. 1 illustrates an enlarged representation of the fastening clamp of the present invention in side view.
Figure 2:
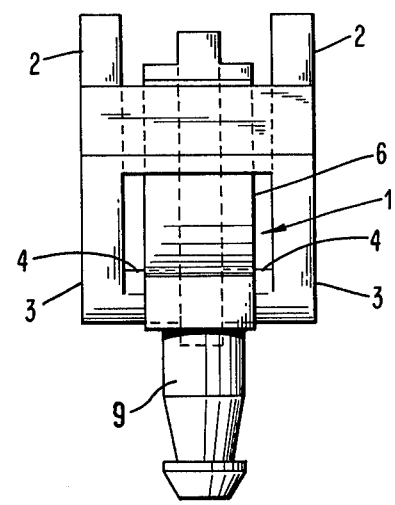
FIG. 2 shows the fastening clamp of FIG. 1 in front view.

Reference will now be made in detail to the presently preferred embodiments of the invention, examples of which are illustrated in the accompanying drawings.

The preferred embodiment of the fastening clamp of the invention, as shown in FIGS. 1-4, is formed of one-piece molded plastic construction. Plastic materials such as poly acetal resine or polyamid are suitable for use in constructing the invention. The clamp comprises an abutment body 1 and clamping arms 2, each clamping arm having a clamping surface 10 formed as an arc of a circle. Abutment body 1 carries on its underside a mounting pin 9 together with a conventional expansion rivet part 13 for anchoring in the hole of a support plate 12 (see FIG. 4).

Figure 4:
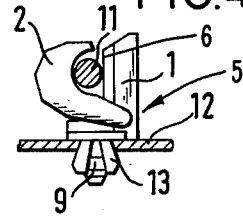
FIG. 4 shows the fastening clamp of FIG. 1 in approximately normal size and in use.

Clamping arms 2 are each mounted in a flexurally rotating manner by their ends 3 to the lower end 5 of abutment body 1 by means of laterally offset pivots 4 which extend parallel to the direction of the axis of the clamped article. That is, clamping arms 2 are rotatable by twisting, or flexing, about fixed, resilient pivots 4. In accordance with the invention, the pivots 4 must be mounted either precisely along the projection of planar clamping surface 6 of abutment body 1 (FIGS. 5–7), or, preferably, on the other side of clamping surface 6 (FIGS. 1 and 4), that is, behind the projection of clamping surface 6 as viewed from the curved clamping surface 10. In any event, pivots 4 must not lie in front of the projection of clamping surface 6, with respect to the clamping surface 10. When an article 11 of round cross section is to be inserted, clamping arms 2 may be easily pressed away, i.e., rotated, from the abutment body 1 by hand, with pivots 4 flexurally twisting against their natural bias when such rotation is imparted. After the article 11 has been inserted, pivots 4 resiliently return under their natural bias causing clamping arms 2 to return so that the article 11 will be solidly clamped between the planar clamping surface 6 of abutment body 1 and the curved clamping surfaces 10, as shown in FIG. 4.

Figure 3:
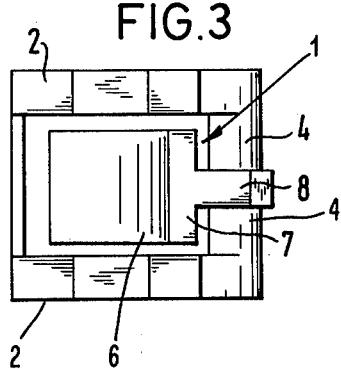
FIG. 3 shows the fastening clamp of FIG. 1 in top view.

Using conventional manufacturing techniques, the abutment body 1 of the present invention is preferably constructed to have a T-shaped cross-section, with crosspiece, or flange 7, forming clamping surface 6. In order to make use of the open space behind abutment flange 7, pivots 4 are preferably attached to the base, or tongue 8, of the T-shape, as shown in FIG. 3. As a result of this compact connection of the pivots to the abutment body, the bulk of the fastening clamp is made as small as possible.

Figure 5:
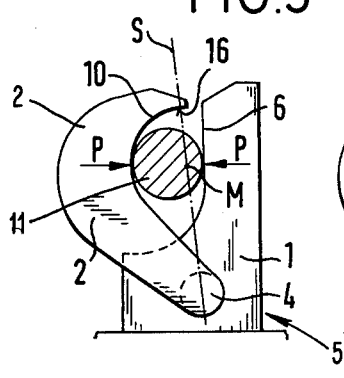
FIG. 5 is a schematic illustration of another embodiment of the clamp of the present invention, with a thin cable inserted therein.
Figure 6:
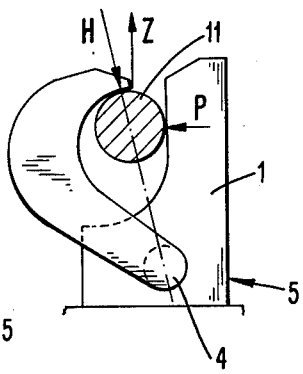
FIG. 6 shows the clamp and inserted cable of FIG. 5 in the presence of dislodging forces.
Figure 7:
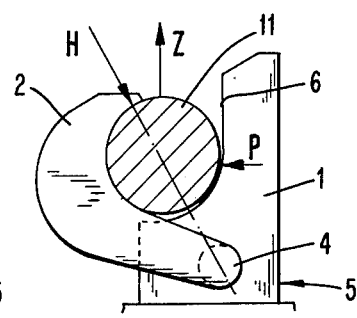
FIG. 7 shows a schematic representation of the clamp of FIG. 5, with a thick cable inserted therein.

FIGS. 5–7 schematically illustrate the design principle and the operation of the fastening clamp of the present invention for clamping elongated articles of different diameters. In the embodiment of the invention shown in FIGS. 5–7 the clamping surface 10, which is in the general shape of an arc of a circle, passes around the article 11 to the extent that the straight line "S" determined by the uppermost resting point 16 of the curved clamping surface 10 and the center point "M" of the circle defining the curved clamping surface 10 passes through the axis of rotation of pivots 4. As shown in FIGS. 6 and 7, this design ensures that when the clamped article is subjected to external forces pulling in the direction of the force arrow "Z" which would tend to dislodge the article, the mounting or retention force "H" passes precisely through the axis of pivots 4, whereby, in theory, clamping arm 2 cannot open on its own in this position. With regard to the fastening clamp shown in FIG. 1, the conditions are even more favorable, because there the straight line "S" passes a distance "r" in front of the axis of pivots 4, as seen from clamping arms 2. Accordingly, for an external force tending to pull the article in the direction shown by the arrow "Z", a torque will be exerted corresponding to the tension force acting on the upper resting point 16 of the curved clamping surface 10 and the distance "r" between the force vector and the pivot axis, with such torque perforce resulting in an increase in the compressive force "P" acting on clamping arms 2 and abutment body 1.

FIGS. 8 and 9 show variations of the fastening clamp of the invention having a vertical, planar clamping surface 6. In the clamp illustrated in FIG. 8 the mounting pin 9 is offset sideways, i.e., laterally in relation to the clamping area, for compactness, whereas in the clamp shown in FIG. 9, the mounting pin 9 is provided in the middle of, i.e., between, two clamping areas.

FIGS. 10 and 11 illustrate a further embodiment of the invention having a horizontal resting surface 6 with lateral insertion of the round article 11. This fastening clamp comprises an expansion rivet part 14 cast onto the underside of abutment body 1 into which a rivet pin 15 is plugged from above.

This fastening clamp offers the advantage that only two mold halves are required for its manufacture.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A one-piece clamp for grasping elongated articles of generally round cross section, comprising:
    an abutment body having a substantially planar clamping surface and having front and rear portions with respect to the direction of insertion of an article into the clamp,
    at least one J-shaped clamping jaw having one end portion forming a curved clamping surface, said surface being formed substantially as an arc of a circle, and another end portion for mounting to said abutment body,
    at least one resilient pivot projecting from the rear portion of said abutment body for pivotally mounting said another end of the jaw to said abutment body, said pivot being integral with said jaw and said abutment body, wherein the rotational axis of said pivot is parallel to the axis of an article caught between said clamping surfaces, said jaw being biased into clamping relationship by said resilient pivot, and wherein said rotational axis lies along the projection of said planar clamping surface, or outside said projection with respect to said curved clamping surface.

2. A clamp according to claim 1, wherein said rotational axis lies along the line determined by the distal end of said arc and the center of said circle determined by said arc, or outside said line with respect to said curved clamping surface.

3. A clamp according to claim 1 or 2, wherein said abutment body is of T-shaped latitudinal cross section and the upper surface of the crosspiece of said T-shape comprises said planar clamping surface, and wherein said pivot is attached to the base of said T-shape.

4. A clamp according to claim 1, including means carried by the rear portion of said abutment body for securing the clamp to a support.

5. A clamp according to claim 1 or 2, including a pair of said J-shaped jaws, with said jaws lying substantially in parallel on opposite sides of said abutment body.

6. A clamp according to claim 4, wherein said means are secured laterally of said rotational axis.

7. A clamp according to claim 6, including a second abutment body oppositely faced from the first abutment body and integral therewith, said second abutment body having a second J-shaped clamping jaw in clamping relationship therewith, wherein said means are secured laterally of the rotational axis of said second jaw.

8. A clamp according to claim 4, wherein said planar clamping surface is substantially perpendicular to said support.

9. A clamp according to claim 4, wherein said planar clamping surface is substantially parallel to said support.

10. A clamp according to claim 1 or 2, wherein the clamp is constructed of a plastic material.

* * * * *